United States Patent
Pablo Curto et al.

(10) Patent No.: US 11,536,452 B2
(45) Date of Patent: Dec. 27, 2022

(54) VALVE ARRANGEMENT FOR A GAS BURNER

(71) Applicant: ORKLI, S. COOP., Ordizia (ES)

(72) Inventors: Marcos Pablo Curto, Hernani (ES); Andoni Unanue Imaz, Idiazabal (ES)

(73) Assignee: ORKLI, S. COOP., Ordizia (ES)

( * ) Notice: Subject to any disclaimer, the term of this patent is extended or adjusted under 35 U.S.C. 154(b) by 150 days.

(21) Appl. No.: 17/141,561

(22) Filed: Jan. 5, 2021

(65) Prior Publication Data
US 2021/0123597 A1    Apr. 29, 2021

Related U.S. Application Data

(63) Continuation of application No. PCT/ES2019/070424, filed on Jun. 18, 2019.

(30) Foreign Application Priority Data

Jul. 6, 2018  (ES) ................................ P201830682

(51) Int. Cl.
*F23N 1/00*    (2006.01)
*F16K 31/06*   (2006.01)
(Continued)

(52) U.S. Cl.
CPC .......... *F23N 1/005* (2013.01); *F16K 31/0644* (2013.01); *F23N 1/007* (2013.01);
(Continued)

(58) Field of Classification Search
CPC ............. F23N 2235/12; F23N 2235/14; F23N 2235/24; F23N 2235/18; F23N 1/002;
(Continued)

(56) References Cited

U.S. PATENT DOCUMENTS 2,203,395 A * 6/1940 Schoenberger ....... F16K 35/027
                                              251/97
3,288,366 A * 11/1966 Fleer .................... F16N 31/006
                                              236/99 R
(Continued)

FOREIGN PATENT DOCUMENTS

CN    105546595 A  *  5/2016  ......... F16K 31/0679
EP       1939526 A2     7/2008
(Continued)

OTHER PUBLICATIONS

International Search Report and Written Opinion received in international application No. PCT/ES2019/070424, dated Jan. 30, 2020 (18 pages).
(Continued)

*Primary Examiner* — David J Laux
(74) *Attorney, Agent, or Firm* — Edell, Shapiro & Finnan, LLC

(57) ABSTRACT

According to one embodiment a valve arrangement for a gas burner is provided that includes a manual gas valve with a manual actuator for opening or closing the gas flow, and an electromagnetic valve having a movable closure member which allows opening or closing a gas passage to the burner. The electromagnetic valve is arranged in the gas valve, with the manual actuator being coupled to a rotary flow regulating element, the manual actuator being configured in order to move the closure member of the electromagnetic valve, opening the gas passage, the manual gas valve including a reduced gas flow channel which puts the inlet conduit in fluid communication with the regulating element regardless of the position of the closure member.

17 Claims, 5 Drawing Sheets

(51) Int. Cl.
*F23N 5/20* (2006.01)
*F23N 5/24* (2006.01)

(52) U.S. Cl.
CPC ............. *F23N 5/206* (2013.01); *F23N 5/245* (2013.01); *F23N 2223/22* (2020.01); *F23N 2225/16* (2020.01); *F23N 2231/04* (2020.01); *F23N 2237/10* (2020.01); *F23N 2237/20* (2020.01)

(58) Field of Classification Search
CPC .. F23N 1/005; F23N 2231/04; F23N 2231/06; F23N 2900/05001; F23N 2900/05002; F23N 5/245; F23N 2237/20; F23N 2237/10; F23D 14/72; F23D 14/825; F24C 3/126
USPC ........................................................ 126/39 G
See application file for complete search history.

(56) References Cited

U.S. PATENT DOCUMENTS

| | | | | |
|---|---|---|---|---|
| 3,297,252 | A | | 1/1967 | King |
| 4,147,494 | A | * | 4/1979 | Ando ...................... F23N 5/247 431/71 |
| 4,830,602 | A | * | 5/1989 | Kaselow ................. F24C 3/126 431/328 |
| 5,575,638 | A | | 11/1996 | Witham |
| 5,816,235 | A | | 10/1998 | Kim |
| 5,975,072 | A | * | 11/1999 | Garceau ................... A47J 37/06 126/39 R |
| 6,192,913 | B1 | * | 2/2001 | Willey .................... F23N 5/107 251/207 |
| 6,666,676 | B2 | * | 12/2003 | Rodriguez-Rodriguez ................. F24C 3/126 431/73 |
| 2003/0102025 | A1 | * | 6/2003 | Garcha ................... F23N 5/107 137/66 |
| 2005/0170302 | A1 | * | 8/2005 | Ayastuy .................... F23N 1/00 431/75 |
| 2016/0313002 | A1 | | 10/2016 | Johncock |
| 2017/0292711 | A1 | * | 10/2017 | Wang ..................... G08C 17/02 |

FOREIGN PATENT DOCUMENTS

| | | | | |
|---|---|---|---|---|
| EP | 2703723 | A1 | | 3/2014 |
| EP | 2789280 | A1 | | 10/2014 |
| GB | 1395774 | A | | 5/1975 |
| GB | 2398629 | A * | 8/2004 | ............. F23N 1/002 |
| JP | H08200689 | A * | 8/1996 | |
| JP | 2011226673 | A * | 11/2011 | ............... F23N 5/06 |
| KR | 20150099080 | A | | 8/2015 |
| WO | WO-9401722 | A1 * | 1/1994 | ........... F23D 14/725 |
| WO | 03098083 | A1 | | 11/2003 |
| WO | 2007100611 | A2 | | 9/2007 |
| WO | 2009040243 | A2 | | 4/2009 |
| WO | WO-2018122714 | A1 * | 7/2018 | ............. F23N 1/007 |
| WO | WO-2018207040 | A1 * | 11/2018 | ............. F23D 14/04 |

OTHER PUBLICATIONS

International Search Report and Written Opinion received in international application No. PCT/EP2017/083394, dated Feb. 16, 2018 (10 pages).

\* cited by examiner

VALVE ARRANGEMENT FOR A GAS BURNER

CROSS-REFERENCE TO RELATED APPLICATIONS

This application relates to and claims the benefit and priority to International Application No. PCT/ES2019/070424, filed Jun. 18, 2019, which claims the benefit and priority to Spanish Patent Application No. P201830682, filed Jul. 6, 2018.

TECHNICAL FIELD

The present invention relates to valve arrangements, and more specifically to valve arrangements for gas burners.

BACKGROUND

Valve arrangements for regulating the gas flow of a gas burner, in which an electromagnetic valve, controlled by a control unit, is arranged between a manual gas valve and the gas burner, with the electromagnetic valve acting as a safety valve, are known. These valve arrangements comprise, for example, a temperature sensor calibrated with a maximum temperature, electrically connected with the control unit to limit a temperature relating to a cooking process in the gas burner. The control unit acts on the electromagnetic valve to cut off the gas flow when the temperature sensor detects overheating in the cooking process.

KR2015099080A describes a valve arrangement for a gas burner comprising a manual gas valve comprising a body comprising a gas inlet conduit, a gas outlet conduit suitable for conducting gas to the burner, and a manual actuator for opening or closing the gas flow through the gas valve, and an electromagnetic valve comprising a movable closure member which allows opening or closing a gas passage to the burner, the electromagnetic valve being powered through an electric circuit, and the electric circuit being connected to at least one sensor.

SUMMARY

Disclosed is a valve arrangement for a gas burner. The valve arrangement of the invention comprises a manual gas valve comprising a body comprising a gas inlet conduit, at least one gas outlet conduit suitable for conducting gas to the burner, and a manual actuator for opening or closing the gas flow through the gas valve, and it also comprises an electromagnetic valve comprising a movable closure member which allows opening or closing a gas passage to the burner, the electromagnetic valve being powered through an electric circuit, and the electric circuit being connected to at least one sensor.

The electromagnetic valve of the valve arrangement is arranged in the body of the gas valve, with the manual actuator of the gas valve being coupled to a rotary gas flow regulating element communicated with the outlet conduit, the manual actuator of the gas valve being configured for moving axially in order to move the closure member of the electromagnetic valve, opening the gas passage, said gas passage communicating the inlet conduit and the regulating element, the manual gas valve comprising a reduced gas flow channel which puts the inlet conduit in fluid communication with the regulating element regardless of the position of the closure member, such that when the closure member of the electromagnetic valve moves to a closed position due to an abnormal situation detected through the sensor, the gas burner remains turned on with the gas flow passing through the channel.

By integrating an electromagnetic valve and a reduced gas flow channel in the same manual gas valve, the valve arrangement of the invention allows managing gas flow to the gas burner, reducing it when the cooking process established in said gas burner is unattended. To that end, the valve arrangement detects an abnormal situation, such as the absence of a pot on the gas burner, an excessive temperature, or the absence of users close to the gas burner by means of a sensor, and reduces the gas flow in said gas burner to a value that does not entail any risk.

This is furthermore obtained with a valve arrangement with a smaller number of parts, as the use of electromagnetic valves with integrated reduced gas flow channels controlled by a control unit is avoided.

These and other advantages and features will become evident in view of the drawings and detailed description.

DETAILED DESCRIPTION

Figure 1:
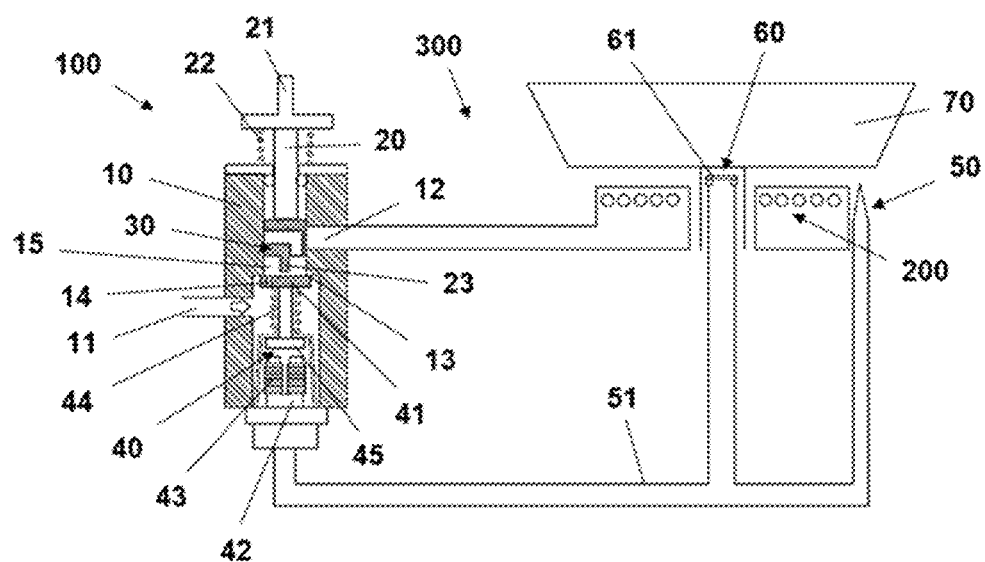
FIG. 1 shows a schematic view a valve arrangement according to one embodiment with the manual gas valve being closed.

FIG. 1 shows a schematic view of an embodiment of the valve arrangement 300 for a gas burner 200 according to the invention. Said valve arrangement 300 comprises a manual gas valve 100 comprising a body 10 comprising a gas inlet conduit 11, a gas outlet conduit 12 suitable for conducting gas to the burner 200, and a manual actuator 20 for opening or closing the gas flow through the gas valve 100. The valve arrangement 300 also comprises an electromagnetic valve 40 comprising a movable closure member 41 which allows opening or closing a gas passage 13, arranged in a housing of the body 10 of the manual gas valve 100, to the burner 200, the electromagnetic valve 40 being powered through an electric circuit 51, and the electric circuit 51 being connected to a sensor 60 which is arranged in series in this embodiment.

The gas valve 100 is a gas valve in which the electromagnetic valve 40 is arranged in the body 10 of said gas valve 100, with the gas inlet conduit 11 being in fluid communication with the electromagnetic valve 40. The manual actuator 20 of the gas valve 100 is coupled to, for example, a conical or cylindrical rotary gas flow regulating element 30 that is in fluid communication with the outlet conduit 12. The regulating element 30 is suitable for regulating the gas flow entering from the gas inlet conduit 11 and through the gas passage 13 to the outlet conduit 12 depending on its angular position, for which it comprises in this embodiment an inlet hole in the lower portion, and at least one outlet hole which is in fluid communication with the outlet conduit 12 of the gas valve 100. In this embodiment, the gas passage 13 is a hole in the body 10 of the gas valve 100 which puts the gas inlet conduit 11 in fluid communication with the regulating element 30 through a chamber 15 arranged below the lower portion of the regulating element 30, in which there is arranged the inlet hole for the gas, and after the gas passage 13, in the gas flow direction.

The manual actuator 20 of the gas valve 100 is configured for moving axially in order to move the closure member 41 of the electromagnetic valve 40, opening the gas passage 13. To that end, the manual actuator 20 comprises a prolongation 23, which can be a shaft that is coupled to the manual actuator 20 and goes through the regulating element 30 in a leak-tight manner.

The manual gas valve 100 comprises a reduced gas flow channel 14 which, in this embodiment, is arranged such that it goes through the closure member 41 in the gas flow direction. Said channel 14 puts the inlet conduit 11 in fluid communication with the regulating element 30 through the chamber 15, such that when the closure member 41 of the electromagnetic valve 40 moves to a closed position due to an abnormal situation detected through the sensor 60, the gas burner 200 continues to be fed with gas and remains turned on, with a gas flow reduced to a specific value passing through the channel 14, the passage of said channel 14 defining the value of the reduced gas flow. After going through the channel 14, the reduced gas flow will feed the burner 200 by flowing through the chamber 15, the regulating element 30, and the gas outlet conduit 12.

In this embodiment, the manual actuator 20 is an actuating shaft rotating between an initial position of rotation and a final position of rotation, the regulating element 30 being coupled to the manual actuator 20 and defining an initial position of rotation and a final position of rotation of said regulating element 30, and thereby defining gas flow regulation in the initial position and in the final position of rotation which, in this embodiment, is for example regulation where there is no gas flow or OFF regulation and regulation where there is a minimum gas flow or MIN regulation, respectively. An angular position, for example of 90°, for maximum gas flow or MAX is arranged between said two positions. There is coupled at one end of the manual actuator 20, and outside the body 10 of the gas valve 100, a control knob 21 which allows the user to use said gas valve 100 manually. In this embodiment, a spring 22 is arranged between the control knob 21 and the body 10, said spring 22 allowing the manual actuator 20, and therefore the control knob 22, to return to an initial standby position when the user no longer presses on said manual actuator 20 and therefore no longer moves it axially.

The structure of the electromagnetic valve 40 can be, for example, like the structure of the electromagnetic valve described in patent application EP3222914A1 belonging to the applicant, which is incorporated by reference. As shown in FIG. 1, the electromagnetic valve 40 comprises an electromagnet comprising a core 42, a reel (not shown in the drawings) inserted in the core 42, and a coil 43 arranged in the reel and around the core 42. The electromagnetic valve 40 also comprises a metal moving armature 45 coupled to the closure member 41, and a spring 44 for returning the closure member 41 together with the moving armature 45 to the closed position of the gas passage 13. The coil 43 comprises a phase wire connected to a phase connector and a grounding wire (not shown in the drawings) electrically connected to the electric circuit 51.

The electric circuit 51 is connected with an electrical supply source 50 such that the electromagnetic valve 40 can be electrically powered. In turn, the sensor 60 comprises an electrical contact 61 which performs the function of a switch in the electric circuit 51 and opens said electric circuit 51 when an abnormal situation occurs, as will be described below, preventing the electromagnetic valve 40 from being electrically powered through said electrical supply source 50. In this embodiment, the electrical supply source 50 is a thermocouple arranged next to the burner 200. The reduced gas flow passing through the channel 14 preferably has a value comprised between the minimum gas flow MIN and the maximum gas flow MAX of the gas valve 100, depending on the heat output of the gas burner 200, and it is sufficient to heat the thermocouple such that said thermocouple supplies sufficient electric current to the electromagnetic valve 40 so as to open it. Once the electromagnetic valve 40 has been electrically powered, the core 43 of the electromagnet can attract the moving armature 45, and the closure member 41 is attracted with said moving armature 45, which closure member 41 moves to its open position and allows opening the gas passage 13.

In the embodiment of the valve arrangement 300 shown in FIG. 1, the sensor 60 is a temperature sensor arranged in the gas burner 200 below a cooking vessel 70 and in contact with the bottom thereof. The electrical contact 61 is a bimetal contact which is in contact with the bottom of the vessel 70 and gradually heats up as long as the flame of the burner 200 is turned on. In this embodiment, the contact 61 is calibrated for a threshold temperature, such that when said threshold temperature is reached in the vessel 70, the bimetal contact 61 is activated and opens the electric circuit 51, with the thermocouple 50 no longer electrically powering the electromagnetic valve 40. In this situation, the core 43 of the electromagnet of the electromagnetic valve 40 no longer attracts the moving armature 45, and therefore no longer attracts the closure member 41, said closure member 41 being moved to its closed position and closing the gas passage 13. The burner 200 continues to be fed with gas, in this situation with the reduced gas flow the channel 14 allows to pass through same.

In another embodiment of the valve arrangement 300, the sensor 60 is a detector for detecting the absence of a cooking vessel 70 arranged on the burner 200, such that said sensor 60 is activated when there is no vessel 70 on said burner 200. In another embodiment of the valve arrangement 300, the sensor 60 is a detector for detecting the absence of people in the surroundings of the burner 200, such that said sensor 60 for sensing the presence of people is activated when no one is in the surroundings of the burner 200 determined by said sensor 60. In that sense, and with the different described configurations of the sensor 60, the valve arrangement 300 offers a safety function against overheating, or a function against unattended gas burners, in which the regulated gas flow in the manual gas valve 100 to the burner 200, is allowed when the electromagnetic valve 40 of said gas valve 100 is in the open position, and in which the reduced gas flow defined by the channel 14 is allowed when the electromagnetic valve 40 is in the closed position.

FIG. 1 shows the valve arrangement 300 in which the gas valve 100 is closed. The manual actuator 20 is in the initial position of rotation in an OFF regulation position with no gas flow. There is no flame in the burner 200, the thermocouple 50 does not generate electricity, and the electromagnetic valve 40 is not electrically powered, the gas passage 13 being closed by the closure member 41.

Figure 2:
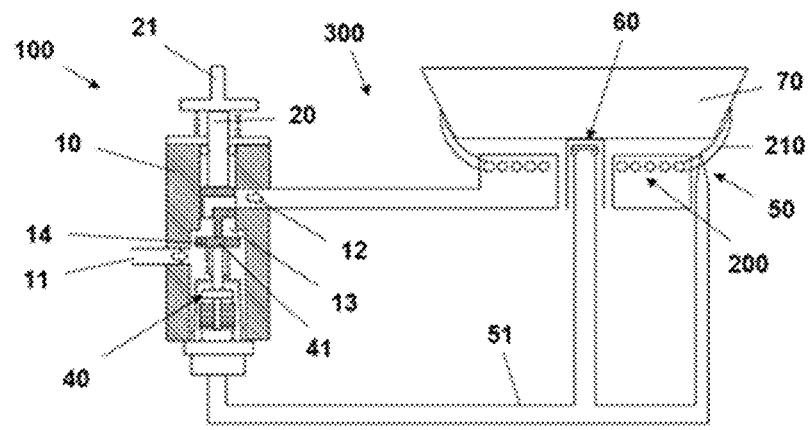
FIG. 2 shows a schematic view of the valve arrangement of FIG. 1, in which the manual actuator of the gas valve is moved axially and rotated, the gas passage to the gas burner is open, and flame is ignited heating a thermocouple which is the electrical supply source of the electromagnetic valve.

FIG. 2 shows a schematic view of the valve arrangement of FIG. 1, in which the gas burner 200 is turned on. To that end, the manual actuator 20 of the gas valve 100 is moved axially by the user pressing on the control knob 21, and said manual actuator 20 is then rotated for rotating the regulating element 30. With the axial movement of the manual actuator 20, the prolongation 23 moves the closure member 41 of the electromagnetic valve 40, opening the gas passage 13. The gas flow from the inlet conduit 11 goes through the gas passage 13, is introduced through the chamber 15 in the regulating element 30 through the inlet hole, and exits to the outlet conduit 12, and therefore to the burner 200, through the at least one outlet hole. Flame 210 is ignited in the burner 200 using manual means or a spark generator (not shown in the drawings), said flame 210 heating the thermocouple which is the electrical supply source 50 of the electromagnetic valve 40. The thermocouple 50 gradually heats up, generating more electricity until the electromagnetic valve 40 is capable of keeping the closure member 41 moved and the gas passage 13 open.

Figure 3:
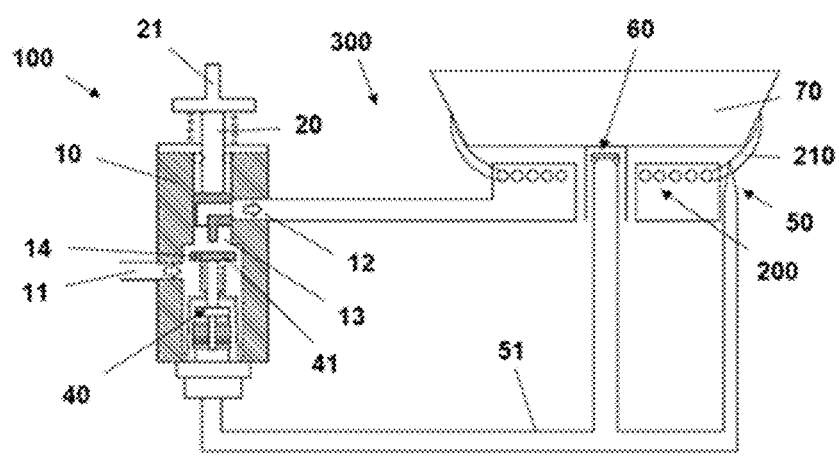
FIG. 3 shows a schematic view of the valve arrangement of FIG. 1, in which the manual actuator is released after igniting the flame in the gas burner, and the electromagnetic valve is electrically powered by the thermocouple.

FIG. 3 shows a schematic view of the valve arrangement of FIG. 1, in which the user releases the manual actuator 20 after igniting the flame 210 in the gas burner 200, the electromagnetic valve 40 is electrically powered by the thermocouple 50, and a time sufficient for said electromagnetic valve 40 to keep the gas passage 13 open only with the electrical power supplied by said thermocouple 50 has elapsed. The spring 22 returns the manual actuator 20 to its original position, and the prolongation 23 of the manual actuator 20 no longer pushes the closure member 41. The gas flow to the burner 200 is that defined by the user upon rotating the manual actuator 20, and therefore the regulating element 30, to a position between the initial position of rotation and the final position of rotation. The flame 210 of the burner 200 gradually heats the vessel 70.

Figure 4:
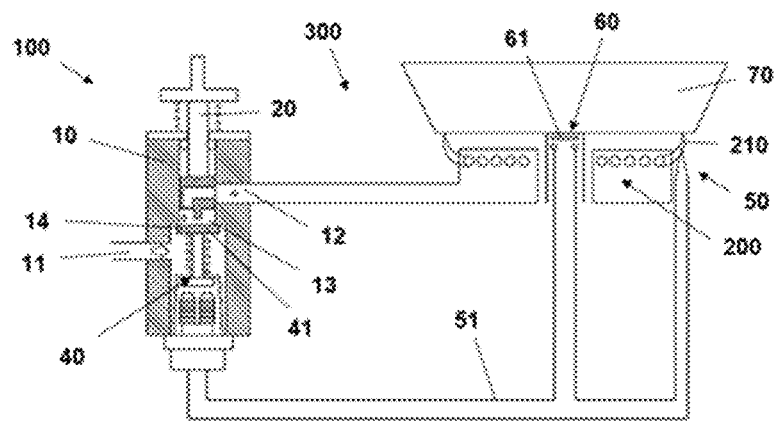
FIG. 4 shows a schematic view of the valve arrangement of FIG. 1, in which the sensor is activated and the electric circuit is open, and the gas passage is closed, the gas flowing to the burner through a reduced gas flow channel arranged in the closure member of the electromagnetic valve.

FIG. 4 shows a schematic view of the valve arrangement of FIG. 1, in which the sensor 60 detects the threshold temperature for which it is defined, the bimetal contact 61 opens, and the sensor 60 is therefore activated, and as a result the electric circuit 51 opens. Therefore, the electromagnetic valve 40 is no longer electrically powered, the electromagnet of said electromagnetic valve 40 no longer attracts the moving armature 45, and the closure member 41 returns to its closed position, closing the gas passage 13. The gas flows to the burner 200 through the reduced gas flow channel 14 arranged, in this embodiment, in the closure member 41 of the electromagnetic valve 40. The flame 210 in the burner 200 is reduced, but it has an enough calorific power for heating the thermocouple 50, and for said thermocouple 50 to generate sufficient electricity to electrically power the electromagnetic valve 40, when the sensor 60 detects a temperature in the vessel 70 that is below the threshold temperature, it is deactivated, and the electric circuit 51 closes again. The gas valve 100 in which the electromagnetic valve 40 is housed can be a standard gas valve, without any modification whatsoever on a manual gas valve comprising an electromagnetic safety valve, with an open position and a closed position in which there is no gas flow to the gas burner.

The valve arrangement 300 also allows manual reset for returning the gas valve 100 to the situation prior to the opening of the electric circuit 51 by the sensor 60 when, for example, the reduced gas flow is not sufficient for the thermocouple 50 to generate sufficient electricity to power the electromagnetic valve 40 and for said valve 40 to open the gas passage 13, attracting the moving armature 45 to the core 42 of the electromagnet of the electromagnetic valve 40. In this embodiment, reset is a voluntary action involving the user pressing on the manual actuator 20 again, putting the moving armature 45 and the core 42 of the electromagnet in contact, such that if the temperature detected by the sensor 60 is already below the threshold temperature, and the contact 61 closes the electric circuit 51, the electricity generated by the thermocouple 50 is sufficient for the electromagnetic valve 40 to be capable of keeping the moving armature 45 and the core 42 of the electromagnet in contact with one another, and the gas passage 13 remains open. In this embodiment of the valve arrangement 300, the resets may not be accidental resets.

The valve arrangement 300 may have warning means (not shown in the drawings) so that the user may know when to reset the gas valve 100, for example. The warning means may comprise, for example, a LED light which lights up when the sensor 60 has been activated, opening the electric circuit 51 and reducing gas flow to the burner 200, and a LED light which lights up when the sensor 60 has been deactivated and the user can then reset the gas valve 100 and return to the previous gas flow.

Figure 5:
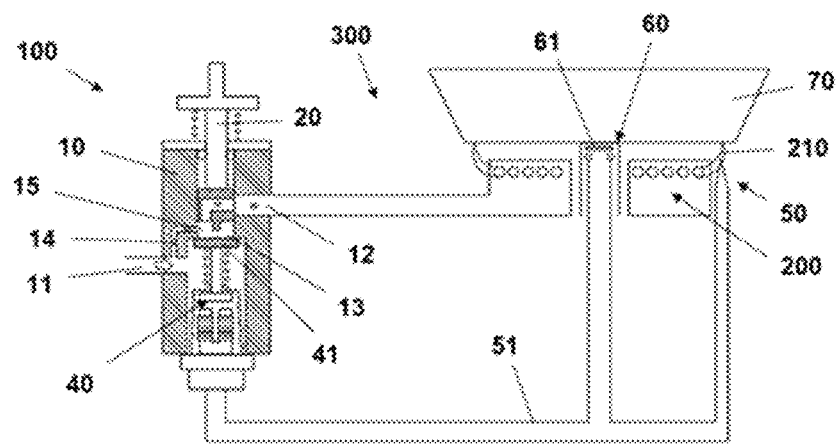
FIG. 5 shows a schematic view of a valve arrangement according to a second embodiment, in which the reduced gas flow channel is arranged in the body of the gas valve.

FIG. 5 shows a schematic view of a second embodiment of the valve arrangement 300 according to the invention. In this second embodiment, the reduced gas flow channel 14 is arranged in the body 10 of the gas valve 100, putting the gas inlet conduit 11 in fluid communication with the chamber 15. The rest of the features of the valve arrangement 300 are the same as those described in the first embodiment, a situation such as that described in FIG. 4 of said first embodiment of the valve arrangement 300 being shown.

In the embodiments of the valve arrangement 300 described above, no external power supply or control unit which electronically manages the electromagnetic valve 40 is required, such that the valve arrangement 300 is completely autonomous.

Figure 6:
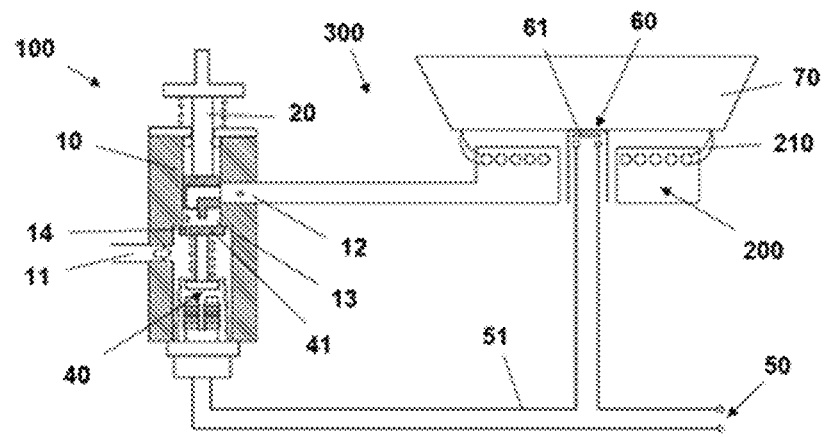
FIG. 6 shows a schematic view of a valve arrangement according to a third embodiment, in which the electrical supply source of the electromagnetic valve is the electrical grid or a DC power source.

FIG. 6 shows a schematic view of a third embodiment of the valve arrangement 300 according to the invention. In this third embodiment, the electrical supply source 50 of the electromagnetic valve 40 is the electrical grid or a DC power source, such as a battery, for example, and said power source is continuous and instantaneous. Depending on the configuration of the electromagnetic valve 40, this external power supply allows, for example, the moving armature 45, and therefore the closure member 41, to move and open the gas passage 13 without delays.

Figure 7:
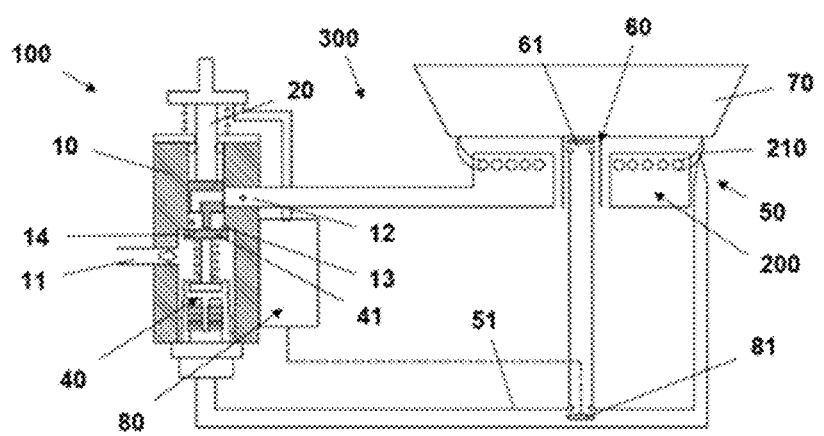
FIG. 7 shows a schematic view of a valve arrangement according to a fourth embodiment comprising a timer, the sensor being activated and the electric circuit open, and the gas passage closed, and the timer is electrically disconnected from the electric circuit.

FIG. 7 shows a schematic view of a fourth embodiment of the valve arrangement 300 of the invention which differs from the embodiment of FIG. 1 in that it further comprises a timer 80. The function of this timer 80 is to temporarily cancel the safety offered by the valve arrangement 300 when, for example, in an embodiment of said valve arrangement 300 in which the sensor 60 is a temperature sensor which detects a threshold temperature, the user wants to cook with a high calorific power in the burner 200. In this example, if the valve arrangement 300 does not comprise the timer 80, when the threshold temperature is reached, the electromagnetic valve 40 will no longer be electrically powered and the burner 200 is fed with the reduced gas flow passing through the channel 14. Said situation remains until the temperature detected by the sensor 60 is below the threshold temperature and the gas flow in the burner 200 returns to the value defined by the user prior to the detection of the abnormal situation. With the timer 80, and at the request of the user, the reduction of gas flow in the burner 200 is canceled for a predefined time, maintaining the gas flow defined by the user with the manual actuator 20.

To perform said function, the timer 80 is mechanically coupled to the manual actuator 20 of the gas valve 100. In the shown embodiment, the timer 80 is arranged externally with respect to the gas valve 100, but in other embodiments it may be integrated with said gas valve 100, the timer 80 being arranged concentric to the manual actuator 20 and between the control knob 21 and the body 10, for example. These different arrangements allow said timer 80 to be activated when the manual actuator 20 is pressed on and moved axially. Moreover, said timer 80 comprises an electrical contact 81 whereby it is electrically connected with the electric circuit 51, being connected in parallel with the contact 61 of the sensor 60 in this embodiment. Therefore, when the sensor 60 detects the threshold temperature, it is activated, with the contact 61 opening the electric circuit 51, and the user presses on the manual actuator 20 activating the timer 80, the contact 81 closing said electric circuit 51 for a predetermined time.

In the valve arrangement 300 shown in FIG. 7, the sensor 60 is activated because it detects the threshold temperature in the vessel 70, and the electric circuit 51 opens, the manual actuator 20 is not pressed, and therefore the timer 80 is not activated, the timer 80 being electrically disconnected from the electric circuit 51. The gas passage 13 is thereby closed, the electromagnetic valve 40 is not electrically powered, and the burner 200 is fed with the reduced gas flow passing through the channel 14.

Figure 8:
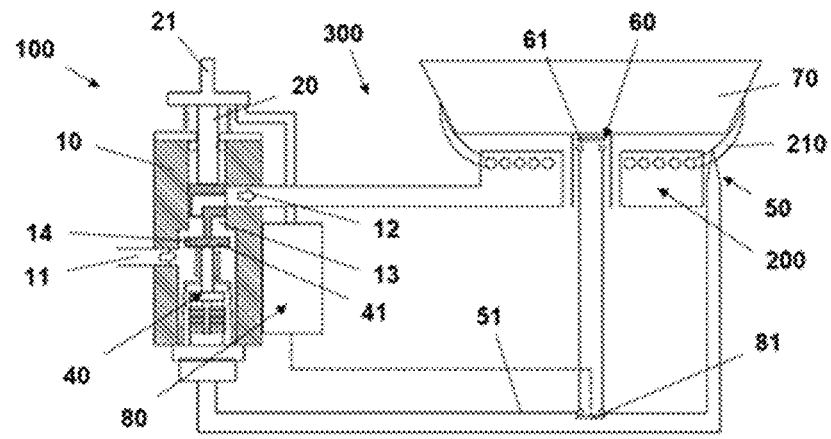
FIG. 8 shows a schematic view of the valve arrangement of FIG. 7, with the sensor being activated and the electric circuit open, and the manual actuator of the gas valve is moved axially, opening the gas passage, and the timer is active, closing the electric circuit.

FIG. 8 shows a schematic view of the valve arrangement of FIG. 7, in which the sensor 60 is activated because it is understood that the sensor still detects the threshold temperature and the electric circuit 51 is open. In this case, the user has decided to intervene by pressing on the manual actuator 20, moving it axially, opening the gas passage 13 and activating the timer 80, the electrical contact 81 closing the electric circuit 51. The electromagnetic valve 40 is electrically powered and the gas passage 13 remains open, such that the burner 200 is fed with the gas flow that the user has defined with the manual actuator 20 by regulating the regulating element 30.

Figure 9:
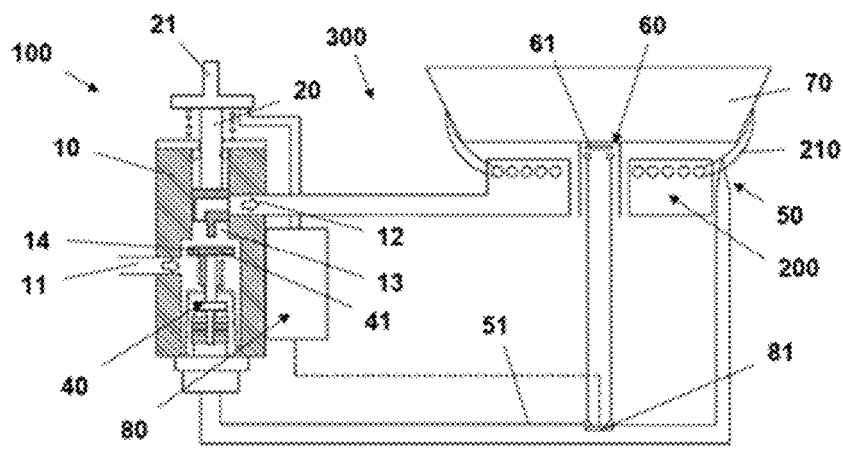
FIG. 9 shows a schematic view of the valve arrangement of FIG. 7, in which the manual actuator is released after activating the timer, the electromagnetic valve being electrically powered by the thermocouple with the gas passage open.

FIG. 9 shows a schematic view of the valve arrangement of FIG. 7, in which after the situation of the valve arrangement 300 shown in FIG. 8 described above, the user releases the manual actuator 20 after activating the timer, said manual actuator 20 returning to its original position due to the spring 22, and since the electromagnetic valve 40 is electrically powered by the thermocouple 50 and the gas passage 13 is open, the burner 200 continues to be fed with the gas flow that the user has defined until the predetermined time defined in timer 80 has elapsed, and the gas flow in the burner 200 is reduced.

The timer 80 can be a pneumatic retarder which, once pressed and depending on the air outlet defined in the retarder, determines a predetermined time, or it can be an electronic timer in which the pressing of the manual actuator 20 activates the timer, said timer having means for determining different predetermined times.

The following clauses present in an unlimited way additional embodiments.

Clause 1. A valve arrangement for a gas burner, comprising
a manual gas valve 100 comprising a body 10 comprising a gas inlet conduit 11, at least one gas outlet conduit 12 suitable for conducting gas to the burner 200, and a manual actuator 20 for opening or closing the gas flow through the gas valve 100, and
an electromagnetic valve 40 comprising a movable closure member 41 which allows opening or closing a gas passage 13 to the burner 200, the electromagnetic valve 40 being powered through an electric circuit 51, and the electric circuit 51 being connected to at least one sensor 60,
the electromagnetic valve 40 is arranged in the body 10 of the gas valve 100, with the manual actuator 20 of the gas valve 100 being coupled to a rotary gas flow regulating element 30 communicated with the outlet conduit 12, the manual actuator 20 of the gas valve 100 being configured for moving axially in order to move the closure member 41 of the electromagnetic valve 40, opening the gas passage 13, said gas passage 13 communicating the inlet conduit 11 and the regulating element 30, the manual gas valve 100 comprising a reduced gas flow channel 14 which puts the inlet conduit 11 in fluid communication with the regulating element 30, such that when the closure member 41 of the electromagnetic valve 40 moves to a closed position due to an abnormal situation detected through the sensor 60, the gas burner 200 remains turned on with the gas flow passing through the channel 14.

Clause 2. The valve arrangement according to clause 1, wherein the closure member 41 comprises the reduced gas flow channel 14.

Clause 3. The valve arrangement according to clause 1, wherein the body 10 of the gas valve 100 comprises the reduced gas flow channel 14.

Clause 4. The valve arrangement according to any of clauses 1 to 3, wherein the electric circuit 51 is connected with an electrical supply source 50 and the sensor 60 opens the electric circuit 51 when an abnormal situation occurs, preventing the electromagnetic valve 40 from being powered through said electrical supply source 50.

Clause 5. The valve arrangement according to clause 4, wherein the electrical supply source 50 is a thermocouple arranged next to the burner 200, the reduced gas flow passing through the channel 14 being sufficient for the thermocouple to supply electric current to the electromagnetic valve 40 which allows moving the closure member 41 and opening the gas passage 13.

Clause 6. The valve arrangement according to clause 4 or 5, wherein the electrical supply source 50 is the electrical grid or a DC power source.

Clause 7. The valve arrangement according to any of the preceding clauses, comprising a sensor 60 which is a temperature sensor that is activated depending on the temperature reached in a vessel 70 arranged on the burner 200.

Clause 8. The valve arrangement according to any of the preceding clauses, comprising a sensor which is a detector for detecting the absence of a vessel 70 arranged on the burner 200.

Clause 9. The valve arrangement according to any of the preceding clauses, comprising a sensor which is a detector for detecting the absence of people in the surroundings of the burner 200.

Clause 10. The valve arrangement according to any of the preceding clauses, wherein the manual gas valve 100 is configured, when the manual actuator 20 is moved axially, for opening the gas passage 13 and keeping it open when the sensor 60 is deactivated and the electric circuit 51 is closed.

Clause 11. The valve arrangement according to any of the preceding clauses, comprising a timer 80 coupled to the manual actuator 20 of the gas valve 100 and electrically connected with the electric circuit 51, the timer 80 closing said electric circuit 51 and opening the gas passage 13 for a predetermined time upon the axial movement of the manual actuator 20, when the sensor 60 is activated and opens the electric circuit 51.

Clause 12. The valve arrangement according to clause 11, wherein the timer 80 comprises a contact 81 which is electrically connected to the electric circuit 51 in parallel with a contact 61 of the sensor 60.

Clause 13. The valve arrangement according to clause 11 or 12, wherein the timer 80 is a pneumatic retarder.

Clause 14. The valve arrangement according to clause 11 or 12, wherein the timer 80 is an electronic timer.

Clause 15. A gas cooking appliance comprising at least one gas burner 200 and a valve arrangement 300 according to any of the preceding clauses associated with said gas burner 200.

What is claimed is:

1. A valve arrangement for a gas burner comprising:
    a manual gas valve having a body, the body including a gas inlet conduit and a gas outlet conduit, the gas outlet conduit being in fluid communication with the gas burner, the manual gas valve including a manual actuator coupled to a rotary gas flow regulating element that is rotatable in the body to control an opening and closing of a gas flow through the manual gas valve, the rotary gas flow regulating element having a gas inlet and at least one gas outlet that are in fluid communication with one another; and
    an electromagnetic valve arranged in the body and including a movable closure member that is moveable between a closed position and an open position to control the flow of gas between the gas inlet conduit and the gas inlet of the rotary gas flow regulating element, the manual actuator being configured to move axially in order to move the closure member from the closed position to open position, the electromagnetic valve being powered through an electric circuit, the electric circuit being connected to at least one sensor; and
    a reduced gas flow channel which is configured to put the gas inlet conduit of the valve body in constant fluid communication with the gas inlet of the rotary gas flow regulating element, such that when the closure member of the electromagnetic valve moves to the closed position due to an abnormal situation detected through the sensor, a reduced gas flow to the gas burner remains turned on with the reduced gas flow passing through the reduced gas flow channel;
    the electric circuit is connected with an electrical supply source and the sensor is configured to open the electric circuit when the abnormal situation occurs, preventing the electromagnetic valve from being powered through the electrical supply source, the electrical supply source being a thermocouple arranged next to the gas burner, when the gas burner is producing a flame, the reduced gas flow passing through the reduced gas flow channel being sufficient for the thermocouple to supply electric current to the electromagnetic valve to allow maintaining the closure member in the open position.

2. The valve arrangement according to claim 1, wherein the closure member of the electromagnetic valve comprises the reduced gas flow channel.

3. The valve arrangement according to claim 2, wherein the electric circuit is connected with an electrical supply source and the sensor is configured to open the electric circuit when the abnormal situation occurs, preventing the electromagnetic valve from being powered through the electrical supply source.

4. The valve arrangement according to claim 1, wherein the body of the manual gas valve comprises the reduced gas flow channel.

5. The valve arrangement according to claim 4, wherein the electric circuit is connected with an electrical supply source and the sensor is configured to open the electric circuit when the abnormal situation occurs, preventing the electromagnetic valve from being powered through the electrical supply source.

6. The valve arrangement according to claim 1, wherein the electrical supply source is an electrical grid or a DC power source.

7. The valve arrangement according to claim 1, wherein the sensor is a temperature sensor configured to determine a temperature of a vessel arranged on the gas burner and to open the electric circuit upon a predetermined temperature of the vessel being reached.

8. The valve arrangement according to claim 1, wherein the sensor is configured to determine an absence of a vessel on the gas burner and to open the electric circuit upon detecting the absence of the vessel on the gas burner.

9. The valve arrangement according to claim 1, wherein the sensor is configured to detect an absence of people in the surroundings of the gas burner and to open the electric circuit upon detecting an absence of people in the surroundings of the gas burner.

10. The valve arrangement according to claim 1, wherein upon the sensor being deactivated and the electric circuit being closed, the closure member of the electromagnetic valve is configured to remain in the open position upon being placed in the open position by use of the manual actuator.

11. The valve arrangement according to claim 1, further comprising a timer mechanically coupled to the manual actuator and electrically connected with the electric circuit, the timer being activated by an axial movement of the manual actuator and configured to close the electric circuit so that electrical power is delivered to the electromagnetic valve to allow the closure member to be maintained in the open position for a predetermined amount of time after the timer is activated even when the abnormal situation is detected by the sensor.

12. The valve arrangement according to claim 11, wherein the timer comprises a contact that is electrically connected to the electric circuit in parallel with a contact of the sensor.

13. The valve arrangement according to claim 12, wherein the timer is a pneumatic retarder.

14. The valve arrangement according to claim 12, wherein the timer is an electronic timer.

15. The valve arrangement according to claim 11, wherein the timer is a pneumatic retarder.

16. The valve arrangement according to claim 11, wherein the timer is an electronic timer.

17. The valve arrangement according to claim 1, wherein the closure member of the electromagnetic valve is continuously urged towards the closed position by a spring.

\* \* \* \* \*